(12) United States Patent
Klapuri et al.

(10) Patent No.: US 12,046,221 B2
(45) Date of Patent: Jul. 23, 2024

(54) USER INTERFACE FOR DISPLAYING WRITTEN MUSIC DURING PERFORMANCE

(71) Applicant: Yousician Oy, Helsinki (FI)

(72) Inventors: Anssi Klapuri, Helsinki (FI); Christoph Thür, Helsinki (FI)

(73) Assignee: Yousician Oy, Helsinki (FI)

( * ) Notice: Subject to any disclaimer, the term of this patent is extended or adjusted under 35 U.S.C. 154(b) by 700 days.

(21) Appl. No.: 17/211,958

(22) Filed: Mar. 25, 2021

(65) Prior Publication Data
US 2022/0310047 A1  Sep. 29, 2022

(51) Int. Cl.
*G10H 1/00* (2006.01)
*G06F 3/0485* (2022.01)
(Continued)

(52) U.S. Cl.
CPC ......... *G10H 1/0016* (2013.01); *G06F 3/0485* (2013.01); *G06F 3/165* (2013.01);
(Continued)

(58) Field of Classification Search
CPC ............... G10H 1/0016; G10H 1/0066; G10H 2210/076; G10H 2210/391; G10H 2220/015; G10H 2220/036; G10H 2220/155; G06F 3/0485; G06F 3/165; G06F 3/167; G10G 1/02
See application file for complete search history.

(56) References Cited

U.S. PATENT DOCUMENTS 7,582,824 B2   9/2009  Sumita
8,530,735 B2 *  9/2013  Maebius .............. G10H 1/0008
                                                                  84/612
(Continued)

FOREIGN PATENT DOCUMENTS

EP         3579223 A1    12/2019

OTHER PUBLICATIONS

Jiang et al. "Piano Score-Following by Tracking Note Evolution" Proceedings of the 16th Sound & Music Computing Conference, ISBN 978-84-09-08518-7, ISSN 2518-3672, May 28-31, 2019, 7 pages.
(Continued)

*Primary Examiner* — Jianchun Qin
(74) *Attorney, Agent, or Firm* — Ziegler IP Law Group LLC.

(57) ABSTRACT

Indicating what should be played in a piece of music with a music document, including: displaying a part of the music document when a user plays the piece; receiving a real-time audio signal of the playing; automatically determining a playing position within the piece of music based on the real-time audio signal; automatically scrolling the music document on a display depending on the playing position; estimating at least the following from the real-time audio signal: activity; tonality; and tempo used in automatically determining the playing position determined from playing speed of the user. The estimating of the activity includes detecting whether the user is producing any sounding notes. The estimating of the tonality is based on an array of chord models that represent different chords that appear in the music document and allow calculating the probability that the corresponding chord is being played in various real-time audio signal segments.

37 Claims, 6 Drawing Sheets

(51) Int. Cl.
*G06F 3/16* (2006.01)
*G10G 1/02* (2006.01)

(52) U.S. Cl.
CPC .............. *G06F 3/167* (2013.01); *G10G 1/02* (2013.01); *G10H 1/0066* (2013.01); *G10H 2210/076* (2013.01); *G10H 2210/391* (2013.01); *G10H 2220/015* (2013.01); *G10H 2220/036* (2013.01); *G10H 2220/155* (2013.01)

(56) References Cited

U.S. PATENT DOCUMENTS

| | | | |
|---|---|---|---|
| 9,142,201 | B2 | 9/2015 | Good et al. |
| 9,767,705 | B1* | 9/2017 | Klapuri ................. G09B 15/00 |
| 10,366,684 | B2 | 7/2019 | Maezawa et al. |
| 10,482,862 | B2* | 11/2019 | Hämäläinen ......... G09B 15/003 |
| 2007/0039447 | A1* | 2/2007 | Schwartz ............... G09B 15/02 |
| | | | 84/470 R |
| 2011/0214554 | A1 | 9/2011 | Nakadai et al. |
| 2011/0277615 | A1 | 11/2011 | Kendler et al. |
| 2018/0174561 | A1* | 6/2018 | Nariyama .............. G10H 1/361 |

OTHER PUBLICATIONS

Nakamura et al. "Real-Time Audio-to-Score Alignment of Music Performances Containing Errors and Arbitrary Repeats and Skips" IEEE/ACM Transaction on Audio, Speech, and Language Processing, vol. 24, No. 2, 2015, arXiv:1512.07748v1 [cs.SD] Dec. 24, 2015, 12 pages.

* cited by examiner

```
300. maintaining a music document defining how different parts should be
played in a piece of music
```
```
301. displaying a part of the music document when a user plays the piece
of music
```
```
302. receiving a real-time audio signal of music playing by the user
```
```
303. automatically determining a playing position of the user within the
piece of music based on the real-time audio signal
```
```
304. automatically scrolling the music document on a display depending
on the playing position of the user
```
```
305. estimating at least following features from the real-time audio signal:
activity tonality and tempo used in the automatically determining the
playing position
```
```
306. in the estimating of the activity, detecting whether the user is
producing any sounding notes
```
```
307. in the estimating of the tonality, using an array of chord models that
represent different chords that appear in the music document and allow
calculating the probability that the corresponding chord is being played in
various real-time audio signal segments
```
```
308. in the estimating of the tempo, using estimated and/or previously
determined playing speed of the user.
```
```
309. in the estimating of the tempo, using estimated and/or previously
determined playing speed of the user
```
```
310. in the estimating of the activity, identifying whether the user is
producing loud enough sounds that match sufficiently well with expected
sounds
```

323. allowing the user to indicate the start position of the performer by scrolling to a certain point of the music document so that the start position is set to a beginning of a portion of the music document visible on the screen, wherein the start position may be known only approximately 324. limiting jumps in the playing position in size/distance 325. allowing jumps only to positions within the currently-visible portion of the music document on the device screen 326. allowing jumps only to beginning of different parts indicated by the music document, such as a part A or part B of a song, the parts indicating different sections of the song 327. using prior probabilities for the performer to pause or jump backward or forward, wherein the prior probabilities of pause or jump occurrences may be set or adjusted in advance.

328. training the chord models from audio data 329. obtaining the chord model using a neural network 330. training the chord model using audio examples where the target chord is sounding, and with examples where the target chord is not sounding so that the model is able to generalize to unseen audio examples and to produce a probability that the target chord is sounding in those 331. configuring the chord model to be independent or agnostic about the component notes belonging to each chord 332. training the chord model solely based on a label used for the chord in music documents (for example abbreviation such as C, Am, G7), and providing the chord model with concrete audio examples representing the chord (C)

Fig. 3, continued

333. performing the training using existing instrument samples on different chords 334. enhancing the training by mixing into the audio samples random noise and / or erroneous additional notes 335. training the chord models from audio data using audio examples where a certain chord is played, and contrasting those with audio examples where the chord is not played 336. basing different chord models on knowing component notes of each chord 337. calculating a correspondence between a given segment of performance audio and a given target chord by assessing whether notes of the target chord are sounding in the performance audio received in the real-time audio signal 338. estimating the activity using measurements of the real-time audio signal 339. using lyrics recognition to track the playing position 340. using speech recognition to detect words being sung and comparing the detected words with the lyrics 341. using speech recognition to input commands from the user, such as jump to given position, pause scrolling, continue scrolling, initiate producing one or more tuning reference sounds, initiate a tuner routine to be performed using an apparatus that performs the method, move backward or forward by a given number of measures, jump to start or end of a given part such as chorus, and/or "jump to a position with given lyrics 342. In the estimating of the tonality, monitoring harmonic content of the audio signal 343. maintaining a plurality of music documents 344. employing recognition of certain pre-defined marker sounds to input commands from the user

USER INTERFACE FOR DISPLAYING WRITTEN MUSIC DURING PERFORMANCE

TECHNICAL FIELD

The aspects of the disclosed embodiments generally relate to user interfaces for musicians.

BACKGROUND

This section illustrates useful background information without admission of any technique described herein representative of the state of the art.

When performing music, usually some kind of written music is used to help the memory of the performer. Written music can take many forms. Music does not always need to be notated in a detailed, note-by-note fashion. In popular music in particular, it is common to use so-called "lead sheets" or "chord charts", where only the chords of a song are written down, sometimes accompanied with the lyrics and/or the melody of the song.

Mobile devices such as phones and tablets are increasingly replacing printed paper when reading music. In other words, it has become increasingly common to read music from a mobile device screen instead of using paper copies. That applies to amateur and expert musicians alike, mainly due to the ease and flexibility of accessing music documents online. However, reading a music document from a mobile device screen presents the problem that only a small portion of the song fits on the screen at a time. As a result, the user must scroll the music document. However, both hands of the user are already occupied when playing the guitar or the piano, for example. Operating the screen thus interrupts or hinders the performance. Controlling the screen by feet would be reasonably convenient but requires dedicated peripheral devices which are far less ubiquitous than usual mobile phones and tablets.

One existing solution to the described problem is a so-called "auto-scroll" functionality. When a user clicks the auto-scroll button in a music-reading application, the application starts to scroll the music document at a constant speed based on the tempo of the song being played. However, that solution has several drawbacks. First, when the user is not playing with a metronome or a backing track, it is hard to keep a steady tempo or even to start with the correct tempo. Second, the user may like to rehearse particularly difficult portions at a lower tempo or vary the tempo as desired. Third, an amateur performer does not usually play through a song uninterrupted, but often stops momentarily, hesitates, or even jumps back a few seconds when noticing an error in the performance, for example. In all those situations, it can be annoying that the auto-scroll feature continues to scroll forward the music document, like a train, without listening to the performer.

Another existing technology is so-called "audio-to-score alignment", also known as "score following", where the idea is to analyze the audio signal of a performance and use that to track the performer's position in the song at each point of the audio signal. That allows an application to automatically scroll the view or to turn the page in the music document, based on estimating where the performer is in the song. However, in the existing technology, it is assumed that detailed notation of the song is available that describes which notes the performer is supposed to play and when. Such methods are not able to track the performer's position when only a lead sheet or a chord chart of the song is available. In addition, the existing technology is typically based on assuming that the performer plays continuously, without significant pauses or jumps backward or forward; that the performer makes only few mistakes; and that the level of background noise is low.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

In the following, term music document refers to chord-based written music, where the harmonic content of a piece of music is described using chord labels. The labels may comprise abbreviated chord names (such as C, Am, G7 or Fmaj7) or symbols (for example I, IV, V, ii) or chord diagrams (as often used for the guitar). Widely used chord-based music documents include for example lead sheets and chord charts. Besides chord labels, the music document may additionally include the lyrics and/or the melody of the song.

According to a first example aspect there is provided a method comprising:

maintaining a music document indicating what should be played in a piece of music;

displaying a part of the music document when a user plays the piece of music;

receiving a real-time audio signal of music playing by the user;

automatically determining a playing position of the user within the piece of music based on the real-time audio signal; and automatically scrolling the music document on a display depending on the playing position of the user;

estimating at least following features from the real-time audio signal: activity; tonality; and tempo used in the automatically determining the playing position;

wherein:

the estimating of the activity comprises detecting whether the user is producing any sounding notes;

the estimating of the tonality is based on an array of chord models that represent different chords that appear in the music document and allow calculating the probability that the corresponding chord is being played in various real-time audio signal segments; and the estimating of the tempo comprises determining the playing speed of the user.

Advantageously, the estimating of the activity may indicate sudden breaks or pauses that the user may make. The estimating of the activity may further enable automatically recognizing ending of breaks so that the automatic scrolling may be intuitively continued without requiring any commands or guidance from the user.

In addition to the chord information, the music document may or may not contain lyrics and/or melody of the song.

Advantageously, the estimating of the tonality may enable identifying the position in song that is currently played by the user. Further advantageously, the estimating of the tonality may enable automatically scrolling the music document at correct position even if the user jumps backward or forward in the song.

Advantageously, the estimating of the tempo may enable correct scrolling of the music document even during song segments that do not contain any chord changes but a same chord is produced for an extended period of time.

The chord may be produced one or several times within the time segment where it is written in the music document. The chord may be played fully, that is, playing all the component notes of the chord simultaneously. The chord may be played partially by playing only a subset of the component notes. The chord may be arpeggiated by sequentially producing one or a few components notes of the chord in a sequence that may be regularly repeating.

The music document indicates the harmonic content of a piece of music with chord labels. The labels may comprise abbreviated chord names (such as C, Am, G7 or Fmaj7) or symbols (for example I, IV, V, ii) or chord diagrams (as often used for the guitar). The music document may additionally include the lyrics and/or the melody of the song. The music document may be a lead sheet. The music document may be a chord chart.

The estimating of the activity may comprise identifying whether the user is producing loud-enough sounds that match sufficiently well with the expected sounds. The sufficiently well matching sounds may be defined as sounds with which a portion of energy fitting into a nominal frequency envelope exceeds 50; 70; or 90%.

The estimating of the activity may comprise detecting pitch values that represent a certain tuning system, such as the 12-tone equal temperament typical to Western music.

The music document may be scrolled in a non-continuous manner, such as page-by-page or a group of lines at a time, wherein the group of lines comprises one or more lines. The estimated position of the performer in the song may determine when the non-continuous scrolling should take place. In case of scrolling page by page, a top part of a next page may be displayed at the bottom of the current page, if the scrolling is about to proceed forward. In case of scrolling page by page, a bottom part of a previous page may be displayed at the top of the current page, if the scrolling is about to proceed backward. In case of displaying the top or bottom of next page to be scrolled onto the display, the current page may be squeezed to fit in the top or bottom part of next page to display.

The method may further comprise receiving a command from the user for toggling the automatic score-following scrolling between an enabled state and a disabled state. The method may comprise receiving the command by speech recognition. The method may comprise receiving the command by using a button. The button may be a soft key. The button may be operable by the user with any linear or non-linear movement.

The method may further comprise estimated confidence in the automatically determining the playing position. The method may further comprise disabling the automatic scrolling of the music document if the confidence falls below a minimum confidence threshold. The minimum confidence threshold may be greater than 2%; 5%; 10%; 20%; or 50%.

The confidence estimation may be based on tracking several position candidates side by side and checking how often the winning candidate changes.

The confidence estimation may be based on checking how large a portion of a probability mass is taken by the winning candidate.

The confidence estimation may be based on evaluating a probability of observed acoustic features given the prediction made by the currently best position candidate.

The method may assume that the user starts playing from the beginning of the song.

The start position of the performer may be previously known. The start position of the performer may be indicated by the user by touching or clicking at a certain point of the music document on a touch screen. The start position of the performer may be indicated by the user by scrolling to a certain point of the music document. The start position may be set to a top of a portion of the music document visible on the screen. The start position may be known only approximately, for example, consisting of the range of positions visible on the screen when the user starts playing.

Jumps in performer playing position may be limited in size. Jumps may be allowed only to positions within the currently visible portion of the music document on the device screen. In other words, the length of any repeated or skipped segment may be limited in size. Jumps may be allowed only to beginning of different parts indicated by the music document, such as a part A or part B or "chorus" or "verse" of a song, the parts indicating different sections of the song.

The method may use prior probabilities for the performer to pause or jump backward or forward. The prior probabilities of pause or jump occurrences may be set or adjusted in advance. The prior probabilities may be defined based on the earlier playing history of the user. The prior probabilities may depend on the time within the song, being higher at sectional boundaries and at barline positions.

The chord models may be trained from audio data. The chord model may be implemented using a neural network. The chord model may be or comprise a Gaussian mixture model. The chord model may be trained by using audio examples where the target chord is sounding, and with examples where the target chord is not sounding so that the model is able to generalize to unseen audio examples and to produce a probability that the target chord is sounding in those. Advantageously, the chord model may be independent or agnostic about the component notes belonging to each chord. Advantageously, the chord model may be trained solely based on a label used for the chord in music documents (for example abbreviation such as C, Am, G7), and then be provided with concrete audio examples representing the chord. The training may operate using existing instrument samples on different chords. The training may be enhanced by mixing into the audio samples random noise and/or erroneous additional notes.

The different chord models may be based on knowing component notes of each chord. A correspondence between a given segment of performance audio and a given target chord may be calculated by assessing whether notes of the target chord are sounding in the performance audio received in the real-time audio signal.

The activity may be determined using measurements of the real-time audio signal. The measurements may be at least partly based on the stability of the pitches audible in the performance audio. Pitched musical sounds have periodic or quasi-periodic time-domain waveforms, and pitch (Hz) is defined as the inverse of the period length. Pitched musical sounds also contain one or more prominent peaks (frequency components) in their frequency-domain spectrum. Advantageously, the inventor has realized that a characteristic to most musical instruments such as the guitar or the piano is that the pitch of the sounds they produce is remarkable stable over time, compared to singing or speech or background noise sounds. The presence/absence of such stable-pitch sounds may be used as a good indicator of playing activity.

The measurements may be at least partly based on regularity of the timing of attack points of sounds in the real-time audio signal. Advantageously, it is one characteristic to continuous playing of music that there usually is regularity in the timing of the beginnings of musical sounds. From those, the underlying pulse and tempo can be inferred by a human listener or by a computer model. Absence of such regularity may indicate that the user is not playing but might be just rehearsing hand positions on the instrument, tuning the instrument, or not playing at all.

The method may further comprise using lyrics recognition to track the playing position. The method may further comprise using speech recognition to detect words being sung and comparing the detected words with the lyrics. Advantageously, using the lyrics may provide for an option to jump to a certain playing position by singing (or even speaking) at least a short fragment of the lyrics at some point while performing. The lyrics may be used to exclude some candidates for playing positions.

Speech recognition may be employed to input commands from the user. The commands may enable jumping to given positions. The command may enable pausing or continuing the scrolling. The command may initiate producing one or more tuning reference sounds. The command may initiate a tuner routine to be performed using an apparatus that performs the method. The commands may include words such as "go back two measures" or "let's go back to the start of the chorus" or "jump to the position or lyrics where it says xyz".

Recognition of certain pre-defined marker sounds may be employed to input commands from the user. The marker sounds may enable jumping to given positions. The marker sounds may enable pausing or forcing forward-scrolling. The marker sounds may include for example tapping three times on the user instrument in a rapid succession, sliding a guitar string upwards or downwards, playing all strings open on the guitar in rapid succession, or playing certain keys at the extreme ends of a keyboard instrument.

Monitoring of the harmonic content of the user may be based on analyzing the harmonic content of a recent segment of the performance real-time audio signal. The harmonic content recent segment may be compared with the harmonic content of the music document at different parts of the document.

The music document may be maintained with a number of other music documents.

According to a second example aspect there is provided an apparatus comprising:

a storage for maintaining a music document defining how different parts should be played in a piece of music;

a display configured to display a part of the music document when a user plays the piece of music; an input for receiving a real-time audio signal of music playing by the user; at least one processor configured to perform at least:

automatically determining a playing position of the user within the piece of music based on the real-time audio signal; and automatically scrolling the music document on a display depending on the playing position of the user;

estimating at least following features from the real-time audio signal: activity; tonality; and tempo used in the automatically determining the playing position; wherein:

the estimating of the activity comprises detecting whether the user is producing any sounding notes;

the estimating of the tonality is based on an array of chord models that represent different chords that appear in the music document and allow calculating the probability that the corresponding chord is being played in various real-time audio signal segments; and the estimating of the tempo comprises determining the playing speed of the user.

The apparatus may be or comprise a mobile phone.
The apparatus may be or comprise a smart watch.
The apparatus may be or comprise a tablet computer.
The apparatus may be or comprise a laptop computer.
The apparatus may be or comprise a desktop computer.
The apparatus may be or comprise a computer.

According to a third example aspect there is provided a computer program comprising computer executable program code which when executed by at least one processor causes an apparatus at least to perform the method of the first example aspect:

According to a fourth example aspect there is provided a computer program product comprising a non-transitory computer readable medium having the computer program of the third example aspect stored thereon.

According to a fifth example aspect there is provided an apparatus comprising means for performing the method of the first example aspect.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Figure 1:
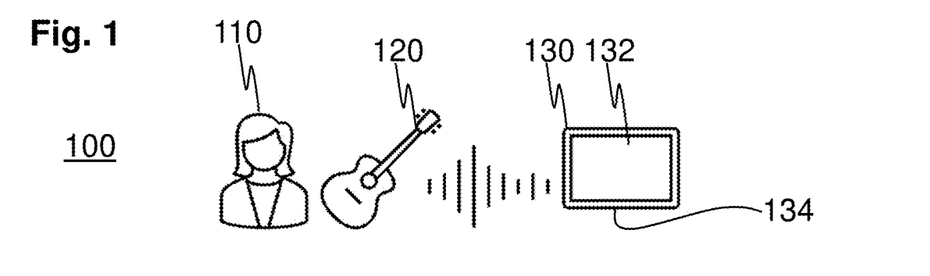
FIG. 1 schematically shows a system according to an example embodiment.

FIG. 1 schematically shows a system 100 according to an example embodiment. The system comprises a musical instrument 120 and an apparatus 130, such as a mobile phone, a tablet computer, or a laptop computer. FIG. 1 further shows a user 110 who is about to play the musical instrument 120.

Figure 2:
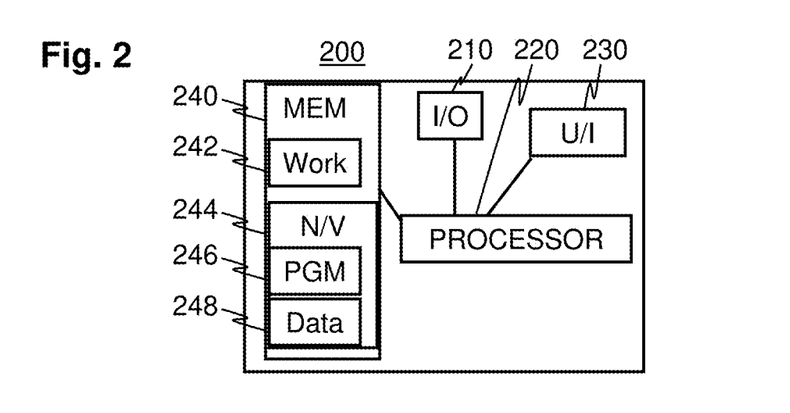
FIG. 2 shows a block diagram of an apparatus according to an example embodiment.

FIG. 2 shows a block diagram of an apparatus 200 according to an example embodiment. The apparatus 200 comprises a communication interface 210; a processor 220; a user interface 230; and a memory 240.

The communication interface 210 comprises in an embodiment a wired and/or wireless communication circuitry, such as Ethernet; Wireless LAN; Bluetooth; GSM; CDMA; WCDMA; LTE; and/or 5G circuitry. The communication interface can be integrated in the apparatus 200 or provided as a part of an adapter, card, or the like, that is attachable to the apparatus 200. The communication interface 210 may support one or more different communication technologies. The apparatus 200 may also or alternatively comprise more than one of the communication interfaces 210.

In this document, a processor may refer to a central processing unit (CPU); a microprocessor; a digital signal processor (DSP); a graphics processing unit; an application specific integrated circuit (ASIC); a field programmable gate array; a microcontroller; or a combination of such elements.

The user interface may comprise a circuitry for receiving input from a user of the apparatus 200, e.g., via a keyboard; graphical user interface shown on the display of the apparatus 200; speech recognition circuitry; or an accessory device; such as a microphone, headset, or a line-in audio connection for receiving the performance audio signal; and for providing output to the user via, e.g., a graphical user interface or a loudspeaker.

The memory 240 comprises a work memory 242 and a persistent memory 244 configured to store computer program code 246 and data 248. The memory 240 may comprise any one or more of: a read-only memory (ROM); a programmable read-only memory (PROM); an erasable programmable read-only memory (EPROM); a random-access memory (RAM); a flash memory; a data disk; an optical storage; a magnetic storage; a smart card; a solid-state drive (SSD); or the like. The apparatus 200 may comprise a plurality of the memories 240. The memory 240 may be constructed as a part of the apparatus 200 or as an attachment to be inserted into a slot; port; or the like of the apparatus 200 by a user or by another person or by a robot. The memory 240 may serve the sole purpose of storing data or be constructed as a part of an apparatus 200 serving other purposes, such as processing data.

A skilled person appreciates that in addition to the elements shown in FIG. 2, the apparatus 200 may comprise other elements, such as microphones; displays; as well as additional circuitry such as input/output (I/O) circuitry; memory chips; application-specific integrated circuits (ASIC); processing circuitry for specific purposes such as source coding/decoding circuitry; channel coding/decoding circuitry; ciphering/deciphering circuitry; and the like. Additionally, the apparatus 200 may comprise a disposable or rechargeable battery (not shown) for powering the apparatus 200 if external power supply is not available.

Figure 3:
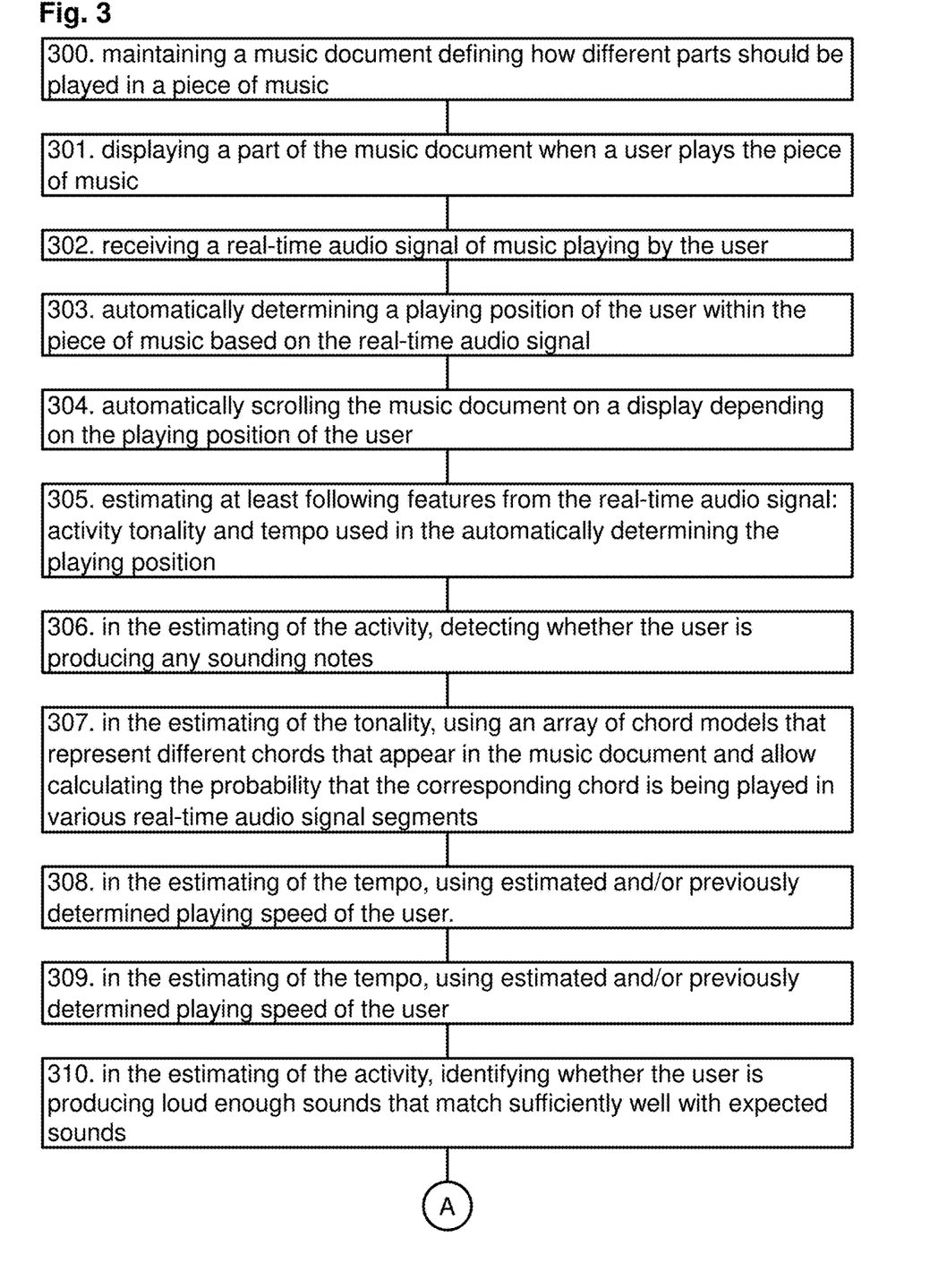
FIG. 3 shows a flow chart according to an example embodiment.

FIG. 3 shows a flow chart according to an example embodiment. FIG. 3 illustrates a process comprising various possible steps including some optional steps while also further steps can be included and/or some of the steps can be performed more than once:

300. maintaining a music document defining how different parts should be played in a piece of music;
301. displaying a part of the music document when a user plays the piece of music;
302. receiving a real-time audio signal of music playing by the user;
303. automatically determining a playing position of the user within the piece of music based on the real-time audio signal; and
304. automatically scrolling the music document on a display depending on the playing position of the user. The method further comprises:
305. estimating at least following features from the real-time audio signal: activity; tonality; and tempo used in the automatically determining the playing position;
306. in the estimating of the activity, detecting whether the user is producing any sounding notes;
307. in the estimating of the tonality, using an array of chord models that represent different chords that appear in the music document and allow calculating the probability that the corresponding chord is being played in various real-time audio signal segments; and
308. in the estimating of the tempo, using estimated and/or previously determined playing speed of the user.

The method may further comprise any one or more of:
309. in the estimating of the tempo, using estimated and/or previously determined playing speed of the user;
310. in the estimating of the activity, identifying whether the user is producing loud enough sounds that match sufficiently well with expected sounds, wherein in some embodiments, the sufficiently well matching sounds are defined as sounds with which a portion of energy fitting into a nominal frequency envelope exceeds 50; 70; or 90%;
311. in the estimating of the activity, identifying a tuning process by identifying typical tuning characteristics;
312. scrolling the music document in a non-continuous manner;
313. determining when a non-continuous scrolling should take place based on an estimated playing position;
314. receiving a command from the user for toggling the automatic score-following scrolling between an enabled state and a disabled state;
315. receiving the command by speech recognition;
316. estimating confidence in the automatically determining the playing position;
317. disabling the automatic scrolling the music document if the confidence falls below a minimum confidence threshold;
318. performing the confidence estimation based on tracking several position candidates side by side and checking how often the winning candidate change;
319. performing the confidence estimation based on checking how large a portion of a probability mass is taken by the winning candidate;
320. performing the confidence estimation based on evaluating a probability of the observed acoustic features given the prediction made by a currently best position candidate;
321. assuming that the user starts playing from the beginning of the song;
322. allowing the user to indicate a start position by touching or clicking at a certain point of the music document on a display;
323. allowing the user to indicate the start position of the performer by scrolling to a certain point of the music document so that the start position is set to a beginning of a portion of the music document visible on the screen; wherein the start position may be known only approximately, for example consisting of the range of positions visible on the screen when the user starts playing;
324. limiting jumps in the playing position in size/distance;

325. allowing jumps only to positions within the currently visible portion of the music document on the device screen;
326. allowing jumps only to beginning of different parts indicated by the music document, such as a part A or part B of a song, the parts indicating different sections of the song;
327. using prior probabilities for the performer to pause or jump backward or forward, wherein the prior probabilities of pause or jump occurrences may be set or adjusted in advance;
328. training the chord models from audio data;
329. obtaining the chord model using a neural network;
330. training the chord model using audio examples where the target chord is sounding, and with examples where the target chord is not sounding so that the model is able to generalize to unseen audio examples and to produce a probability that the target chord is sounding in those;
331. configuring the chord model to be independent or agnostic about the component notes belonging to each chord;
332. training the chord model solely based on a label used for the chord in music documents (for example abbreviation such as C, Am, G7), and providing the chord model with concrete audio examples representing the chord;
333. performing the training using existing instrument samples on different chords;
334. enhancing the training by mixing into the audio samples random noise and/or erroneous additional notes;
335. training the chord models from audio data using audio examples where a certain chord is played, and contrasting those with audio examples where the chord is not played;
336. basing different chord models on knowing component notes of each chord;
337. calculating a correspondence between a given segment of performance audio and a given target chord by assessing whether notes of the target chord are sounding in the performance audio received in the real-time audio signal;
338. estimating the activity using measurements of the real-time audio signal. The measurements may be at least partly based on the stability of the pitches audible in the performance audio. Pitched musical sounds have periodic or quasi-periodic time-domain waveforms, and pitch (Hz) is defined as the inverse of the period length. Pitched musical sounds also contain one or more prominent peaks (frequency components) in their frequency-domain spectrum. Advantageously, the inventor has realized that a characteristic to most musical instruments such as the guitar or the piano is that the pitch of the sounds they produce is remarkable stable over time, compared to singing or speech or background noise sounds. The presence/absence of such stable-pitch sounds may be used as a good indicator of playing activity. The estimation of activity may be at least partly based on regularity of the timing of attack points of sounds in the real-time audio signal. Advantageously, it is one characteristic to continuous playing of music that there usually is regularity in the timing of the beginnings of musical sounds. From those, the underlying pulse and tempo can be inferred by a human listener or by a computer model. Absence of such regularity may indicate that the user is not playing but might be just rehearsing hand positions on the instrument, tuning the instrument, or not playing at all;
339. using lyrics recognition to track the playing position;
340. using speech recognition to detect words being sung and comparing the detected words with the lyrics. Advantageously, using the lyrics may provide for an option to jump to a certain playing position by singing (or even speaking) at least a short fragment of the lyrics at some point while performing. The lyrics may be used to exclude some candidates for playing positions;
341. using speech recognition to input commands from the user. The commands may enable jumping to given positions. The command may enable pausing or continuing the scrolling. The command may initiate producing one or more tuning reference sounds. The command may initiate a tuner routine to be performed using an apparatus that performs the method. The commands may advantageously include words such as "go back two measures" or "let's go back to the start of the chorus" or "jump to the position or lyrics where it says xyz".
342. In the estimating of the tonality, monitoring harmonic content of the audio signal. The harmonic content may be analyzed in a recent segment of the real-time audio signal. The recent segment may be compared with a harmonic content of the music document at different parts of the document;
343. maintaining a plurality of music documents;
344. employing recognition of certain pre-defined marker sounds to input commands from the user, wherein the marker sounds may enable jumping to given positions; and/or the marker sounds may enable pausing or forcing forward-scrolling; and/or the marker sounds may include for example tapping three times on the user instrument in a rapid succession, sliding a guitar string upwards or downwards, playing all strings open on the guitar in rapid succession, or playing certain keys at the extreme ends of a keyboard instrument.

Figure 5:
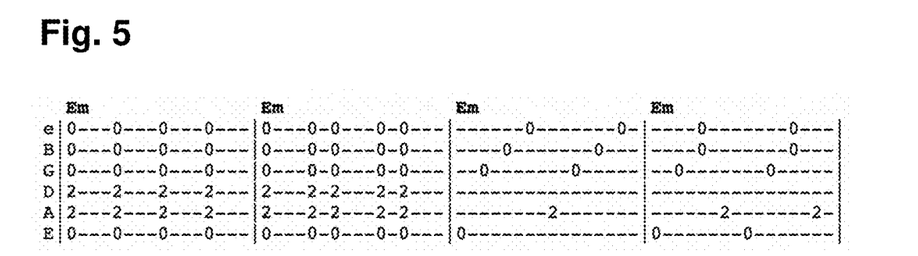
FIG. 5 shows an illustration of some ways to play chords as entire chords or sequentially as arpeggiated playing.

The chord may be produced one or several times within the time segment where it is written in the music document. The chord may be played fully, that is, playing all the component notes of the chord simultaneously. The chord may be played partially by playing only a subset of the component notes. The chord may be arpeggiated by sequentially producing one or a few components notes of the chord in a sequence that may be regularly repeating. FIG. 5 illustrates some example ways of performing the E minor chord ("Em"). For the illustration, we use a tablature format, where time runs from left to right and the six rows indicate the six strings of a guitar. In the first two measures (separated by vertical lines), the user plays the entire chord (all strings at once) in a rhythmic manner, and the rhythmic pattern is different in the first two measures. In the latter two measures, the performer applies "arpeggiated" playing, picking component notes of the chord in a certain sequence. All those four measures represent valid ways of playing the Em chord. In a chord-based music document, only "Em" is shown, and the detailed rendering of the chord is left to the performer to choose. Notice that numbers 0 illustrate times when a free string is played, and number 2 illustrates time when a string is pressed down at a second fret when played.

The music document indicates the harmonic content of a piece of music with chord labels. The labels may comprise abbreviated chord names (such as C, Am, G7 or Fmaj7) or symbols (for example I, IV, V, ii) or chord diagrams (as often used for the guitar). The music document may additionally include the lyrics and/or the melody of the song. The music document may be a lead sheet. The music document may be a chord chart.

An example of some embodiments is next described with reference to FIG. 4.

Let us consider real-time audio-to-score alignment for a use case where the existing score following solutions are not effective. Our use case has two characteristics that render previous methods ineffective. Let us look at both of those separately in the following:

Firstly, we consider music documents, where only the chords of a song are written down in some compact form, often together with the lyrics of the song. That means that only the harmonic changes, also called chord changes, are written down, without indicating the exact pitches that the performer should play or the times when they should be played. In other words, we do not know in advance what kind of rhythmic pattern and pitch pattern the user is going to choose. The "texture" of the music is thus not specified in advance. Yet, conventional score following algorithms operate by calculating a distance measure between a given segment of the performance audio and all the different time points in the music document (often limiting to points nearby the current estimated position). However, in the case of chord-based written music, the detailed note-by-note music document is missing, so there is hardly anything to compare against: we do not know in advance what kind of arrangement/texture the performer will use to render the lead sheet into a performance. Arrangement here refers both to a rhythmic pattern and a selection of the notes (e.g., related to the chord indicated on the lead sheet) to be played at each time. For example, at the point where the chord change is indicated, the performer may not play anything at all (which occurs very often in reggae genre, for example).

In the present example, we assume that there is a finite number of chords that are used on lead sheets. They can be labelled with abbreviations such as C, Dm, Gmaj7, Am6, for example, or with some other symbols such as guitar chord diagrams. Notably, there is a model for each chord to allow calculating a match between that chord and a given segment of the performance audio. For a given segment of the performance audio, we then evaluate the match between the audio and the models of all the unique chords that occur in the song being performed. Evaluating the match in this context refers to calculating a probability that the chord is sounding in the audio segment in question. The model can be trained from audio data, or it can be defined heuristically. In the case of training, a neural network (for example) can be provided with a lot of audio examples where the chord is sounding and where it is not sounding.

Because the performer is free to choose the rhythmic pattern and texture when performing from a lead sheet, we do not know when exactly the performer will play any component notes of the chord. Therefore, we need to monitor the playing activity of the performer and weight the likelihoods of different chords in such a way that more importance is given to time points in the performance where the performer is detected to actually play something (that is, where performance information is present).

Secondly, we consider amateur performers who play in a casual setting—for example practicing at home without an audience. Then, the performer may pause her performance, jump backward or forward, and make considerable amount of performance mistakes. The performer may also speak during performance pauses and may or may not sing while performing. (We do not rule out skilled performers who perform the song uninterrupted from start to end, but those are rather considered here as exceptionally "easy cases.")

Figure 4:
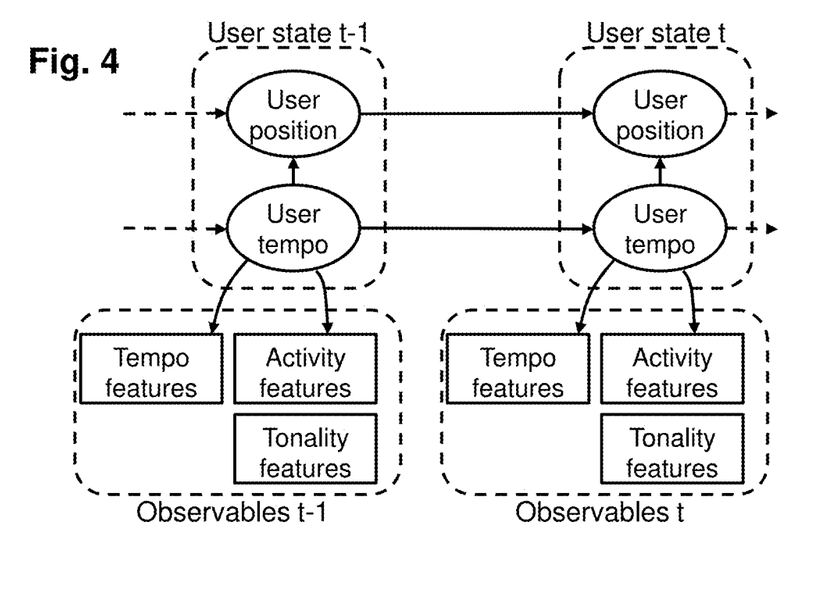
FIG. 4 shows an overview of an example embodiment.

FIG. 4 shows an overview of an example method. We describe this method using the general framework of hidden Markov models (HMMs), where blocks correspond to variables and arrows show dependencies between the variables. However, this conceptual description does not mean that the proposed technique can be implemented only using HMM models, but for example neural networks can also be used. At each time point t during the performance, we are interested in the performer's position in the song, later denoted by x(t), and performer's tempo (playing speed), later denoted by v(t). This "user state at time t," is not directly observable and is therefore called "hidden state." Observable quantities are indicated on bottom of FIG. 4 as dashed boxes. These depend on the user state and can be used to infer the (hidden) user state.

We use three types of observables to infer user position and tempo. They are all obtained by analyzing the performance audio signal in real time:

Activity features indicate when the user is actually playing as opposed to momentarily not producing any sounding notes from the instrument. The latter can be due to any reason, such as a rest (silent point) in the rhythmic pattern applied, or due to the performer pausing her performance. Accordingly, activity features play two roles in our system: 1) They allow weighting the calculated likelihoods of different chords in such a way that more importance is given to time points in the performance where the performer actually plays something (that is, where performance information is present). 2) Activity features allow the method to keep the estimated position fixed when the performer pauses and continue moving the position forward when performance resumes. For amateur performers, it is not uncommon to hesitate and even stop for a moment to figure out a hand position on the instrument, for example. Also, when performing at home, it is not uncommon to pause performing for a while to discuss with another person, for example. More technically, activity features describe in an embodiment the probability of any notes sounding in a given audio segment: p(NotesSounding|AudioSegment(t)) as a real number between 0 and 1.

Tonality features monitor the pitch content of the user's performance. As described above, when performing from a lead sheet, we do not know in advance the exact notes that the user will play nor their timing: the arrangement/texture of the music is unknown in advance. For that reason, we instead employ an array of models that represent different chords that may appear in the lead sheets. The models allow calculating a "match" or "score" for those chords: the likelihood that the corresponding chord is sounding in a given segment of the performance audio. Note that the system can be even totally agnostic about the component notes of each chord—for example when the model for each chord is trained from audio data, giving it examples where the chord is/is not sounding. Tonality feature vector is obtained by calculating a match between a given segment of performance audio and all the unique chords that occur in the song. More technically: probabilities of different chords sounding in a given an audio segment t: p(Chord(i)|AudioSegment(t)), where the chord index i=1, 2, . . . , <number of unique chords in the song>. Tonality features help us to estimate the probability for the performer to be at different parts of the song. Amateur performers sometimes jump backward in the performance to repeat a short segment or to fix a performance mistake. Also jumps forward are possible.

Harmonic content of the user's playing allows the method to "anchor" the users position in the song even in the presence of such jumps.

Tempo features are used to estimate the tempo (or, playing speed) of the performer in real time. In many songs, there are segments where the chord does not change for a long time. Within such segments, the estimated tempo of the user drives the performer's position forward. In other words, even in the absence of chord changes (harmonic changes), having an estimate of the tempo of the user allows us to keep updating the performer's position. More technically: probabilities of different tempos (playing speeds) given the performance audio segment t, $p(\text{Tempo}(j)|\text{AudioSegment}_{0, 1, 2, \ldots, t}))$, where index j covers all tempo values between a minimum and maximum tempo of interest.

By combining information from the above-mentioned three features, we can tackle the various challenges in tracking the position x(t) of an amateur performer when only chord-based written music is available:
1. Activity features help to detect the moments where performance information is present, in other words, where the performer is actually producing some sounding notes. They also capture the situation when the user pauses playing.
2. Tonality features indicate the possible positions (at a larger time scale) where the user could be in the song. This feature helps to deal with cases where the user jumps forward or backward in the song.
3. Tempo features drive forward user position locally, within segments where the tonality remains the same for some time. User position x(t) at time t can be extrapolated from the previous position x(t−1) and the playing speed v(t). However sometimes the user may jump backward or forward within the song. In that case, tonality features help to detect the jump and "reset" this locally linear extrapolation of the performer's position.

Any of the above-described methods, method steps, or combinations thereof, may be controlled or performed using hardware; software; firmware; or any combination thereof. The software and/or hardware may be local; distributed; centralized; virtualized; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the aspects of the disclosed embodiments. It is however clear to a person skilled in the art that the present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present disclosure, and not in limitation thereof. Hence, the scope of the disclosed embodiments are only restricted by the appended patent claims.

The invention claimed is:

1. A method comprising:
maintaining a music document indicating what should be played in a piece of music;
displaying a part of the music document when a user plays the piece of music;
receiving a real-time audio signal of music playing by the user;
automatically determining a playing position of the user within the piece of music based on the real-time audio signal;
automatically scrolling the music document on a display depending on the playing position of the user; and
estimating at least the following features from the real-time audio signal: activity; tonality; and tempo used in automatically determining the playing position; wherein:
estimating of the activity comprises detecting whether the user is producing any sounding notes;
estimating of the tonality is based on an array of chord models that represent different chords that appear in the music document and allow calculating a probability that a corresponding chord is being played in various real-time audio signal segments; and
estimating of the tempo comprises determining a playing speed of the user; the method further comprising:
estimating a confidence in automatically determining the playing position based on any one or more of:
tracking several position candidates side by side and checking how often a winning candidate changes;
checking how large a portion of a probability mass is taken by the winning candidate; and
evaluating probability of observed acoustic features given a prediction made by a currently best position candidate.

2. The method of claim 1, wherein the music document does not contain detailed note-by-note performance instruction, but only a harmonic progression of a song corresponding to the music document, indicated with chord names, chord symbols or chord diagrams.

3. The method of claim 1, wherein the music document is scrolled in a non-continuous manner.

4. The method of claim 1, further comprising allowing the user to toggle with a user interface automatic score-following scrolling between an enabled state and a disabled state.

5. The method of claim 1, wherein a start position from which the user starts playing is previously known.

6. The method of claim 1, wherein a start position from which the user starts playing is identified by allowing the user to touch or click at a certain point of the music document on a touch screen as indication of the start position or a scrolled view from beginning of which the playing is about to start.

7. The method of claim 1, wherein a jump in the playing position is limited in size.

8. The method of claim 1, further comprising using prior probabilities for a performer to pause or jump backward or forward in determining the playing position.

9. The method of claim 1, wherein different chord models are based on knowing component notes of each chord.

10. The method of claim 1, further comprising training the chord models from audio data using audio examples where a certain chord is played, and contrasting the trained chord models with audio examples where the certain chord is not played.

11. The method of claim 1, wherein the activity is estimated using measurements of the real-time audio signal, wherein the measurements are at least partly based on a stability of pitches audible in a performance audio.

12. The method of claim 1, wherein the estimation of activity is at least partly based on regularity of a timing of attack points of sounds in the real-time audio signal.

13. The method of claim 1, wherein the estimating of the activity further comprises identifying whether the user is producing loud enough sounds that match sufficiently well with expected sounds.

14. The method of claim 1, wherein the estimating of the activity further comprises detecting pitch values that represent a tuning system.

15. The method of claim 1, further comprising using lyrics recognition to track the playing position.

16. The method of claim 1, further comprising using speech recognition as input commands from the user, the input commands configured to enable performing at least one of:
jumping to given positions;
pausing or continuing the scrolling;
initiating producing one or more tuning reference sounds;
initiate a tuner routine to be performed using an apparatus that performs the method;
scroll to a given part of lyrics, by saying a command word followed by a fragment of the lyrics;
scroll to a given goal;
scroll to a given sectional part of a song or piece of music.

17. The method of claim 1, further comprising recognizing pre-defined marker sounds as input commands from the user, the input commands configured to enable for performing at least one of:
pausing the scrolling of the music document;
forcing forward-scrolling of the music document;
forcing backward-scrolling of the music document;
jumping to a beginning or and end of a current sectional part;
jumping one musical measure backward or forward.

18. An apparatus comprising:
a storage for maintaining a music document indicating what should be played in a piece of music;
a display configured to display a part of the music document when a user plays the piece of music;
an input for receiving a real-time audio signal of music playing by the user; and
at least one processor configured to perform at least the method of claim 1.

19. A computer program stored in a non-transitory computer readable medium, comprising computer executable program code which when executed by at least one processor causes an apparatus at least to perform the method of claim 1.

20. A method comprising:
maintaining a music document indicating what should be played in a piece of music;
displaying a part of the music document when a user plays the piece of music;
receiving a real-time audio signal of music playing by the user;
automatically determining a playing position of the user within the piece of music based on the real-time audio signal;
automatically scrolling the music document on a display depending on the playing position of the user; and
estimating at least the following features from the real-time audio signal: activity; tonality; and tempo used in automatically determining the playing position; wherein:
estimating of the activity comprises detecting whether the user is producing any sounding notes;
estimating of the tonality is based on an array of chord models that represent different chords that appear in the music document and allow calculating a probability that a corresponding chord is being played in various real-time audio signal segments; and
estimating of the tempo comprises determining a playing speed of the user; the method further comprising:
training the chord models from audio data using audio examples where a certain chord is played, and contrasting the trained chord models with audio examples where the certain chord is not played.

21. The method of claim 20, wherein the music document does not contain detailed note-by-note performance instruction, but only a harmonic progression of a song corresponding to the music document, indicated with chord names, chord symbols or chord diagrams.

22. The method of claim 20, wherein the music document is scrolled in a non-continuous manner.

23. The method of claim 20, further comprising allowing the user to toggle with a user interface automatic score-following scrolling between an enabled state and a disabled state.

24. The method of claim 20, wherein a start position from which the user starts playing is previously known.

25. The method of claim 20, wherein a start position from which the user starts playing is identified by allowing the user to touch or click at a certain point of the music document on a touch screen as indication of the start position or a scrolled view from beginning of which the playing is about to start.

26. The method of claim 20, wherein a jump in the playing position is limited in size.

27. The method of claim 20, further comprising using prior probabilities for a performer to pause or jump backward or forward in determining the playing position.

28. The method of claim 20, wherein different chord models are based on knowing component notes of each chord.

29. The method of claim 20, wherein the activity is estimated using measurements of the real-time audio signal, wherein the measurements are at least partly based on a stability of pitches audible in a performance audio.

30. The method of claim 20, wherein the estimation of activity is at least partly based on regularity of a timing of attack points of sounds in the real-time audio signal.

31. The method of claim 20, wherein the estimating of the activity further comprises identifying whether the user is producing loud enough sounds that match sufficiently well with expected sounds.

32. The method of claim 20, wherein the estimating of the activity further comprises detecting pitch values that represent a certain tuning system.

33. The method of claim 20, further comprising using lyrics recognition to track the playing position.

34. The method of claim 20, further comprising using speech recognition to input commands from the user, the commands configured to enable performing at least one of:
jumping to given positions;
pausing or continuing the scrolling;

initiating producing one or more tuning reference sounds;

initiate a tuner routine to be performed using an apparatus that performs the method;

scroll to a given part of lyrics, by saying a command word followed by a fragment of the lyrics;

scroll to a given goal;

scroll to a given sectional part of a song or piece of music.

35. The method of claim 20, further comprising recognizing pre-defined marker sounds as input commands from the user, the input commands configured to enable performing at least one of:

pausing the scrolling of the music document;

forcing forward-scrolling of the music document;

forcing backward-scrolling of the music document;

jumping to the beginning or end of the current sectional part;

jumping one musical measure backward or forward.

36. An apparatus comprising:

a storage for maintaining a music document indicating what should be played in a piece of music;

a display configured to display a part of the music document when a user plays the piece of music;

an input for receiving a real-time audio signal of music playing by the user; and at least one processor configured to perform at least the method of claim 20.

37. A computer program stored in a non-transitory computer readable medium, comprising computer executable program code which when executed by at least one processor causes an apparatus at least to perform the method of claim 20.

* * * * *